United States Patent
Kwa et al.

(10) Patent No.: US 7,426,598 B2
(45) Date of Patent: Sep. 16, 2008

(54) METHOD FOR CONFIGURING TRANSMITTER POWER CONSUMPTION

(75) Inventors: Seh Kwa, San Jose, CA (US); Animesh Mishra, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/509,131

(22) Filed: Aug. 23, 2006

(65) Prior Publication Data

US 2006/0285553 A1 Dec. 21, 2006

Related U.S. Application Data

(62) Division of application No. 10/882,544, filed on Jun. 30, 2004, now Pat. No. 7,197,591.

(51) Int. Cl.
*G06F 13/40* (2006.01)

(52) U.S. Cl. ............................ 710/307; 713/322; 326/86

(58) Field of Classification Search .................. 710/100, 710/305, 307, 71; 713/300, 320, 322; 326/86; 709/301; 327/26, 156; 370/468, 466

See application file for complete search history.

(56) References Cited

U.S. PATENT DOCUMENTS

| | | | |
|---|---|---|---|
| 5,297,262 A | | 3/1994 | Cox et al. |
| 5,926,049 A | | 7/1999 | Shi |
| 6,091,300 A | * | 7/2000 | Setty et al. .................. 330/258 |
| 6,347,850 B1 | | 2/2002 | Volk |
| 6,378,018 B1 | | 4/2002 | Tsern et al. |
| 6,633,178 B2 | | 10/2003 | Wilcox et al. |
| 6,642,758 B1 | | 11/2003 | Wang et al. |
| 6,667,641 B1 | | 12/2003 | Wang et al. |
| 6,885,209 B2 | | 4/2005 | Mak et al. |
| 6,984,965 B2 | * | 1/2006 | Vinciarelli .................. 323/266 |
| 7,065,301 B2 | * | 6/2006 | Shastri et al. ................ 398/183 |
| 2002/0062454 A1 | * | 5/2002 | Fung .......................... 713/300 |

(Continued)

FOREIGN PATENT DOCUMENTS

TW      432812      5/2001

(Continued)

OTHER PUBLICATIONS

"High speed data links using power line carrier equipment" by Thompson et al. (abstract only) Publication Date: Nov. 5-8, 1991.*

(Continued)

*Primary Examiner*—Paul R Myers
(74) *Attorney, Agent, or Firm*—Blakely, Sokoloff, Taylor & Zafman LLP (57) ABSTRACT

A method is described which comprises propagating electronic signals within circuitry comprising a transmitter to select a number of the transmitter's lanes, set a speed for each of the lanes, and set at least a driver supply voltage for each of the lanes. The number and speed determine the transmitter's bandwidth. Power consumed by the transmitter as a consequence of the lane number selection, lane speed setting and driver supply voltage is less than a power that would have been consumed by the transmitter had another available combination of lane number, lane speed and supply voltage been effected for the transmitter.

14 Claims, 7 Drawing Sheets

U.S. PATENT DOCUMENTS

| | | | |
|---|---|---|---|
| 2002/0083241 A1 | 6/2002 | Moller | |
| 2004/0003310 A1 | 1/2004 | Hsu | |
| 2006/0015761 A1* | 1/2006 | Kwa et al. | 713/320 |
| 2006/0034295 A1 | 2/2006 | Cherukuri et al. | |
| 2006/0285553 A1* | 12/2006 | Kwa et al. | 370/468 |

FOREIGN PATENT DOCUMENTS

| | | |
|---|---|---|
| TW | 583571 | 4/2004 |

OTHER PUBLICATIONS

Lattice Semiconductor Corporation, "PCI Express IP Data Sheet," Apr. 2004, 8 pages.

Intel Corporation, "Wireless Intel SpeedStep Power Manager. Optimizing power consumption for the Intel PXA27x processor family," Whitepaper, 2004, 16 pages.

Grochowski, E., et al, "Best of Both Latency and Throughput," ICCD Conference Proceedings, 2004, 8 pages.

National Instruments Corporation, "PCI Express- An Overview of the PCI Express Standard," 2004, 9 pages.

Chen, et al., "A power-efficient wide-range phase-locked loop" Publication date: Jan. 2002, 3 pages (abstract only).

Foreign Office Action from Counterpart China Patent Application No. 200580021292.6, mailed Feb. 1, 2008 (11 pages translation included).

Foreign Office Action from Counterpart European Patent Application No. 05763841.3, mailed Sep. 5, 2007 (4 pages).

Claims deemed allowable from Counterpart Taiwan Patent Application No. 94121906, mailed Jan. 14, 2008 (8 pages).

International Preliminary Report on Patentability and Written Opinion Of The International Searching Authority, mailed Jan. 9, 2007 (7 pages).

Taiwan IPO Search Report from Counterpart Taiwan Patent Application No. 94121906 1 page, mailed Jan. 14, 2008 (1 page).

* cited by examiner

METHOD FOR CONFIGURING TRANSMITTER POWER CONSUMPTION

PRIORITY

This application is a divisional of prior Application Ser. No. 10/882,544, filed Jun. 30, 2004 and is now U.S. Pat. No. 7,197,591 issued Mar. 27, 2007.

FIELD OF INVENTION

The field of invention relates generally to computing systems; and, more specifically, to dynamic lane, voltage and frequency adjustment for a serial interconnect.

BACKGROUND

Figure 1A:
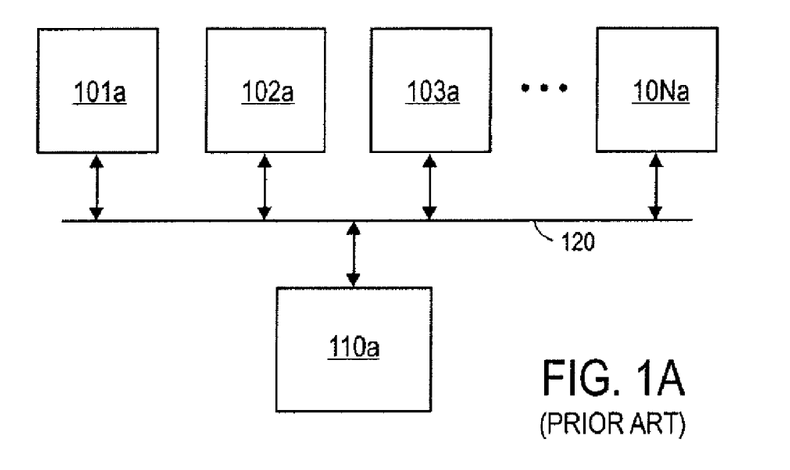
FIG. 1a shows components interconnected through a bus.

FIG. 1a shows a depiction of a bus 120. A bus 120 is a "shared medium" communication structure that is used to transport communications between electronic components 101a-10Na and 110a. Shared medium means that the components 101a-10Na and 110a that communicate with one another physically share and are connected to the same electronic wiring 120. That is, wiring 120 is a shared resource that is used by any of components 101a-10Na and 110a to communicate with any other of components 101a-10Na and 110a. For example, if component 101a wished to communicate to component 10Na, component 101a would send information along wiring 120 to component 10Na; if component 103a wished to communicate to component 110a, component 103a would send information along the same wiring 120 to component 110a, etc.

Computing systems have traditionally made use of busses. For example, with respect to certain IBM compatible PCs, bus 120 corresponds to a PCI bus where components 101a-10Na correspond to "I/O" components (e.g., LAN networking adapter cards, MODEMs, hard disk storage devices, etc.) and component 110a corresponds to an I/O Control Hub (ICH). As another example, with respect to certain multiprocessor computing systems, bus 120 corresponds to a "front side" bus where components 101a-10Na correspond to microprocessors and component 110a corresponds to a memory controller.

Owing to an artifact referred to as "capacitive loading", busses are less and less practical as computing system speeds grow. Basically, as the capacitive loading of any wiring increases, the maximum speed at which that wiring can transport information decreases. That is, there is an inverse relationship between a wiring's capacitive loading and that same wiring's speed. Each component that is added to a wire causes that wire's capacitive loading to grow. Thus, because busses typically couple multiple components, bus wiring 120 is typically regarded as being heavily loaded with capacitance.

In the past, when computing system clock speeds were relatively slow, the capacitive loading on the computing system's busses was not a serious issue because the degraded maximum speed of the bus wiring (owing to capacitive loading) still far exceeded the computing system's internal clock speeds. The same cannot be said for at least some of today's computing systems. That is, with the continual increase in computing system clock speeds over the years, the speed of today's computing systems are reaching (and/or perhaps exceeding) the maximum speed of wires that are heavily loaded with capacitance such as bus wiring 120. Other problems associated with increasing bus speed is signal distortion.

Therefore computing systems are migrating to a "link-based" component-to-component interconnection scheme.

Figure 1B:
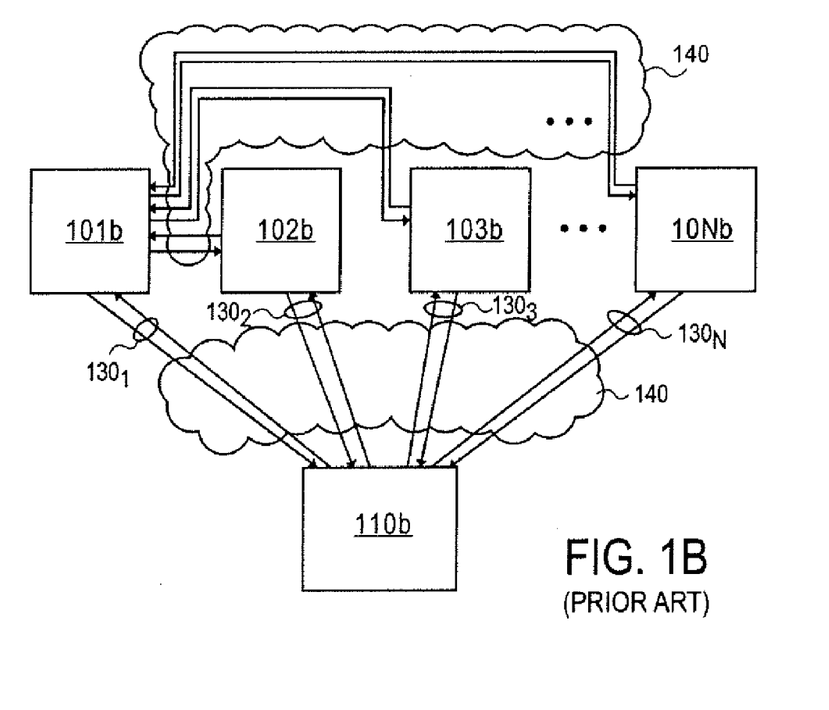
FIG. 1b shows components interconnected through a mesh of point-to-point links.

FIG. 1b shows a comparative example vis-à-vis FIG. 1a. According to the approach of FIG. 1b, computing system components 101a-10Na and 110a are interconnected through a mesh 140 of high speed bi-directional point-to-point links $130_1$ through $130_N$. A bi-directional point-to-point link typically comprises a first unidirectional point-to-point link that transmits information in a first direction and a second unidirectional point-to-point link that transmits information is a second direction that is opposite that of the first direction. Because a unidirectional point-to-point link typically has a single endpoint, its capacitive loading is substantially less than that of a shared media bus.

Each point-to-point link can be constructed with copper or fiber optic cabling and appropriate drivers and receivers (e.g., single or differential line drivers and receivers for copper based cables; and LASER or LED E/O transmitters and O/E receivers for fiber optic cables; etc.). The mesh 140 observed in FIG. 1b is simplistic in that each component is connected by a point-to-point link to every other component. In more complicated schemes, the mesh 140 is a network having routing/switching nodes. Here, every component need not be coupled by a point-to-point link to every other component Instead, hops across a plurality of links may take place through routing/switching nodes in order to transport information from a source component to a destination component. Depending on implementation, the routing/switching function may be a stand alone function within the mesh network or may be integrated into a substantive component of the computing system (e.g., processor, memory controller, I/O unit, etc.).

Figure 2:
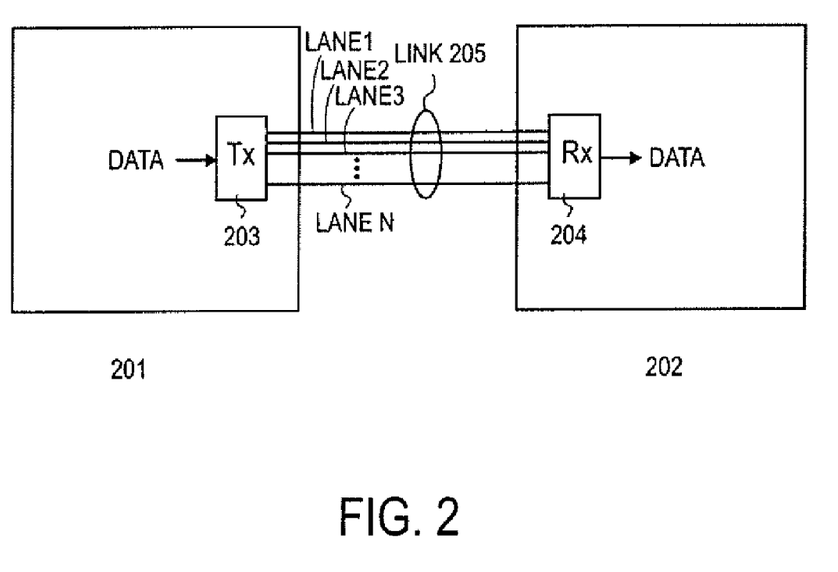
FIG. 2 shows a multi lane unidirectional point-to-point link.

FIG. 2 shows a "zoom-in" of a type of uni-directional point-to-point link that may be referred to as a "multi-lane" uni-directional point-to-point link. A multi-lane uni-directional point-to-point link includes a plurality of serial channels referred to as "lanes". Referring to FIG. 2, as an example, component 201 may be viewed as a first component within a link-based computing system and component 202 may be viewed as a second component within a link-based computing system. The observed unidirectional point-to-point link between them 205 includes N lanes $LANE_1$ through $LANE_N$.

Each lane is a serial channel that can be implemented as, for example, a differential signal line, a single-ended signal line or a fiber optic channel. In operation, transmitter 203 receives data to be transmitted over the link 205 to receiver 204. Transmitter 203 spreads the data received at its input over the N lanes. For example if the input to the transmitter 203 is an 8 byte word and if N=8, then, a simple transmitter design would transmit: a first byte of the input word over lane 0; a second byte of the input word over lane 1; . . . etc.; and, the eighth byte of the input word over lane N (where N=8). The receiver 204 would receive the eight bytes, ensure their alignment, and present the 8 byte word at its output (thus completing the transfer of the word from component 201 to 202).

In other approaches, the lanes do not transport data from a same parallel word but instead are treated as separate individual communication lanes. For example, if lane 0 transmits as a first communication channel and lane 1 transmits as a second communication channel, the source of the data carried by lane 0 (e.g., that entity that sent the data to transmitter 203) would be different that the source of the data carried by lane 1.

A problem is that the transmitter is apt to be designed with circuitry (such as a CMOS circuitry) that consumes increasingly more power as the speed of the lanes increase.

FIGURES

The present invention is illustrated by way of example, and not limitation, in the figures of the accompanying drawings in which like references indicate similar elements and in which.

DETAILED DESCRIPTION

Figure 3:
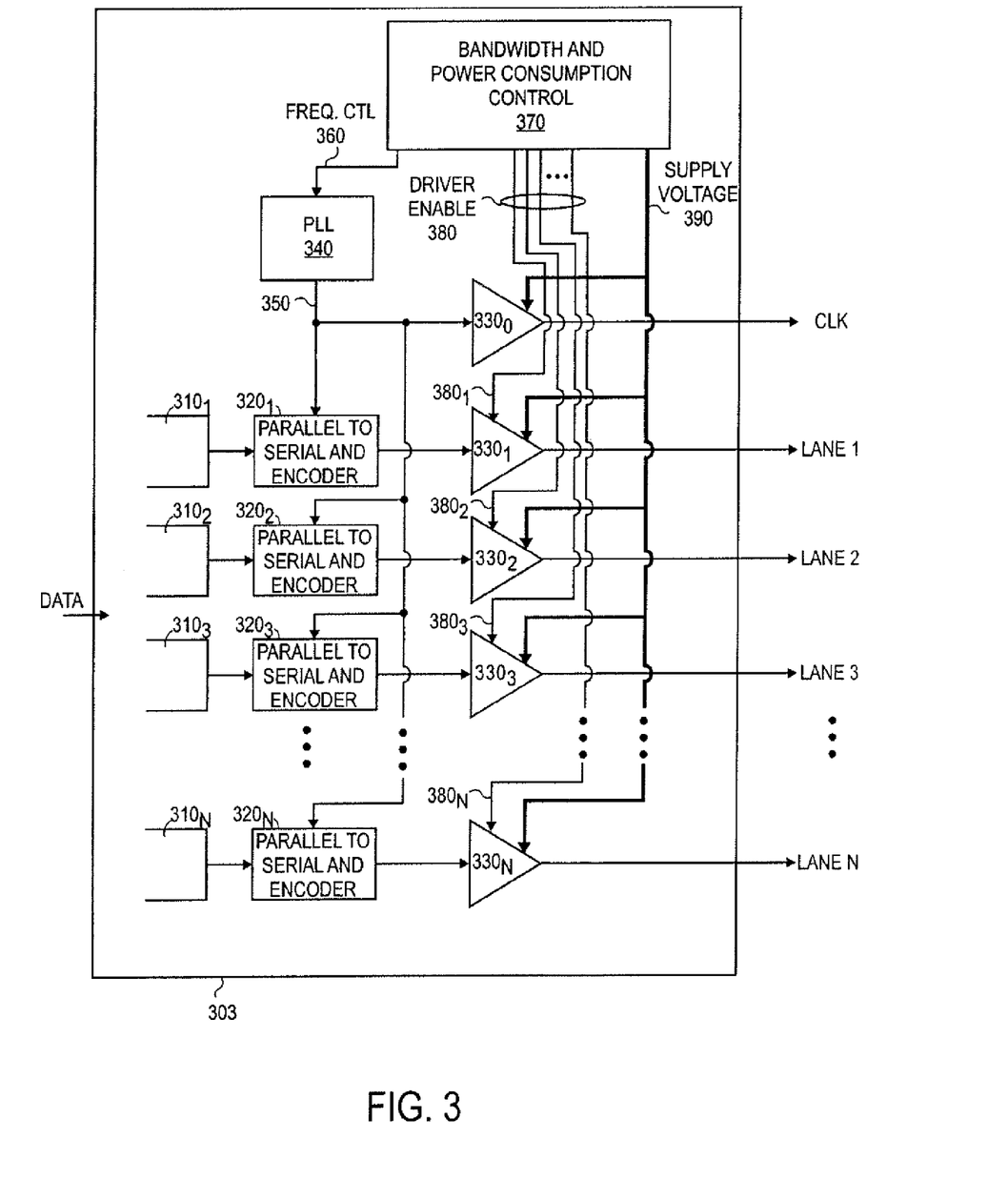
FIG. 3 shows a transmitter for a multi lane unidirectional point-to-point link having lane speed, the number of active lanes and the supply voltage as input parameters.

FIG. 3 shows a transmitter design 303 for a multi-lane uni-directional point-to-point link that provides for variable control over three variables that together determine the transmitter's power consumption and bandwidth: 1) lane speed; 2) the number of active lanes; and, 3) supply voltage. Here, the bandwidth of the transmitter should be understood to mean the bandwidth of the multi-lane unidirectional point-to-point link; which, in turn, is the lane speed factored by the number of active lanes. For example, if there are eight active lanes that each run at a speed of 800 Mb/s; then, the bandwidth of the multi-lane uni-directional point-to-point link associated with the transmitter is 6.4 Gb/s (i.e., 8×800 Mb/s=6400 Mb/s=6.4 Gb/s).

By allowing the lane speed, the number of active lanes and the supply voltage to be programmable parameters, the transmitter can be configured to operate at an appropriate bandwidth with reduced power consumption. Before discussing how these programmable parameters might be used to provide for acceptable bandwidth and reduced power consumption, however, a discussion of the design of the transmitter 303 of FIG. 3 will first be provided.

According to the transmitter design 303 of FIG. 3, each lane has a queue that queues parallel bits of information; where, each unit of parallel bits of information may be referred to as "word". For example, continuing with the example discussed in the background where each lane from amongst a total of eight active lanes is provided with a different byte of information from a larger 64 bit input, each queue would receive one of these different bytes and each different byte would be referred to as a word (e.g., queue $310_1$ would receive a first word/byte, queue $310_2$ would receive a second word/byte, etc.). For simplicity, the circuitry that feeds the lane input queues 310 is not shown in FIG. 3.

Each enqueued word is removed from its queue and processed by a parallel to serial and encoding block along each lane (i.e., the word removed from queue $310_1$ is processed by parallel to serial and encoding block $320_1$; the word removed from queue $310_2$ is processed by parallel to serial and encoding block $320_2$; etc.). A parallel to serial and encoding block performs two functions: 1) parallel to serial conversion; and, 2) serial encoding.

Parallel to serial conversion is the process of converting word into a serial bit stream. For example, again continuing with the example where the lane word size is one byte, the corresponding parallel to serial conversion would convert each byte from the queue into an 8 bit serial stream. Serial encoding is a process that attempts to reduce the probability of data corruptions stemming from specific data patterns and the manner in which these specific data patterns are processed at the receiving end of the lane. Various forms of serial encoding techniques exist such as 4B/5B and 8B/10B.

It is important to note that lane speed is determined from the rate at which bits present themselves along the serial bit stream that is created by the parallel to serial conversion process (and, typically, the serial encoding technique as well). Because the serial to parallel and serial encoding circuitry is timed by a clock signal, the above described rate is a function of the frequency of the clock signal. The clock signal is generated by a phase lock loop (PLL) circuit 340 and is presented to each of the parallel to serial and encoding blocks $320_1$ through $320_N$ (along trace 350 as depicted in FIG. 3).

Here, note that the PLL circuit 340 includes an input 360 for setting the frequency of the PLL output clock signal. In a first embodiment, input 360 flows to the PLL's feedback divider to set the PLL's frequency multiplication of its input oscillation frequency. In a second embodiment, input 360 sets the PLL input oscillation frequency outright (e.g., by multiplexing in signals from different input oscillators, or using an input oscillator capable of configurable oscillation frequency).

Regardless as to how the PLL output clock signal frequency is controlled, note that the ability to control it corresponds to one of three aforementioned parameters that can be configured for the transmitter 303. Better said, recalling that lane speed was initially referred to as one of the three configurable parameters, and noting from the discussion immediately above that lane speed is a function of PLL output clock signal frequency—it follows that input 360 to the PLL corresponds to the first of the adjustment parameters: lane speed.

Before continuing, it is important to note that in some embodiments the serial encoding function may be eliminated entirely. That is, the exposure to data integrity problems is (for whatever reason) not a significant concern or an encoding process has been performed "higher up" in the system that the transmitter 303 is a part of. In such cases circuitry 320 can be viewed as simply being a parallel to serial block that includes parallel to serial circuitry (e.g., a parallel to serial converter).

The second of the three configurable parameters is the number of active lanes. Once parallel to serial conversion and encoding is complete, the encoded serial bit stream that is created along each active lane is sent to a driver circuit (e.g., the encoded serial bit stream produced by block $320_1$ is sent to driver $330_1$, the encoded serial bit stream produced by block $320_2$ is sent to driver $330_2$, etc.). A driver is: 1) an electronic circuit designed to drive an electronic bit stream over an extended distance; or, 2) an electro/optic transmitter that converts an electronic bit stream into light that is launched onto a fiber optic cable for transmission over an extended distance.

Whether the drivers $330_1$ through $330_N$ are electronic or electro/optic, note that each has its own corresponding enable/disable input $380_1$ through $380_N$. Activation of a driver's enable input causes the driver to be "enabled" so as to perform its driving function. Inactivation of a driver's enable input causes the driver to "disabled" so as to be unable perform its driving function. Because the driver circuitry (and/or light source in the case of an electro/optic driver) is effectively turned off when the driver is disabled, the driver consumes significantly less power when it is disabled as compared to when it is enabled.

The driver enable/disable lines 380 therefore control how many active lanes are to exist and, in so doing, also effect the power consumption of the overall transmitter 303. Here, although not specifically shown in FIG. 3, an enable line that flows to a particular lane driver may also be used to enable/disable the circuitry preceding the lane driver (e.g., the lane's parallel to serial and encoding block and/or the lane's queue). As such, for a fixed lane speed per lane, increasing the number of active lanes will increase transmitter power consumption as whole (because more circuitry will be "on").

Moreover, at least for CMOS circuits, increasing the lane speed of an active lane (by increasing the PLL output clock signal frequency) will also increase transmitter power consumption. Thus, taken together, the number of active lanes and the lane speed not only determines overall transmitter bandwidth (as discussed in detail at the beginning of this detailed description)—but also plays an important factor in determining the overall transmitter power consumption. Generally, power consumption is best kept low, particularly in the case of battery operated devices such as laptop computers (so as to extend operation life time under battery power).

The transmitter design 303 depicted in FIG. 3, which is capable of adjusting the lane speed and the number of active lanes, likewise enables a particular desired bandwidth to be configured that takes in account, with the hope of reducing, the transmitter's power consumption.

For example, assuming that power consumption increases no-linearly with each increment in clock speed frequency and linearly with each activated lane, it may turn out that: 1) "low bandwidth" links exhibit their lowest power consumption operating point through reduction of active lanes at the expense of increased lane speed; and, 2) "high bandwidth" links exhibit their lowest power consumption operating point through reduction of lane speed at the expense of increased active lane count. As an example of the former, a 100 Mb/s link may be configured with a single active lane that operates at a 100 Mb/s (i.e., the number of active lanes is reduced to the minimum value of one). As an example of the later, a 3.2 Gb/s link may be configured with all N=16 lanes being activated and configured to operate at 200 Mb/s (i.e., the lane speed is merely doubled from the former example but the active lane count is increased by a factor of 16).

The precise combination of lane speed and number of active drivers that reaches or at least approaches a minimal transmitter power consumption operating point for a particular link bandwidth can be determined by those of ordinary skill; and, moreover, is a function of the underlying technology (e.g., electric vs. electro-optic, CMOS vs. Bi-CMOS, 0.25 μm vs. 90 nm, etc.). As such, a detailed discussion of how to determine the appropriate combination is not necessary nor practical for purposes of the present description. That potentially a wealth of different combinations can be set for any one bandwidth (e.g., for a 2 Gb/s link: one 2 Gb/s lane; or, two 1 Gb/s lanes; or, four 500 Mb/s lanes; or, eight 250 Mb/s lanes, etc.) so as to provide a spread of different power consumption operating points—at least one of which is at or closest to a theoretical minimal power consumption operating point for the transmitter (regardless of the transmitter's underlying technology)—is the main point of emphasis.

A third programmable feature is the power consumption of the driver itself. The architecture of FIG. 3 shows each of the drivers receiving a same supply voltage from a power bus 390. Here, it is to be understood that the actual supply voltage that is supplied on power bus 390 can be adjusted too. For example, according to one embodiment, the supply voltage that is presented on power bus 390 can be any of 3.3 v, 2.5, 1.8 v or 1.3 v. Moreover, although not shown in FIG. 3 (and similar to the enable lines 380), the power bus can be routed so as to supply the circuitry that precedes the driver for each lane. As such, the power consumption of each lane can be directly effected through adjustment of the supply voltage.

In various embodiments however, particularly in the case of "off chip" drivers, the drivers are deliberately designed to have their own, higher supply voltage (as compared to the circuitry that precedes the drivers) for purposes of driving stronger signals over the lane to the receiver (i.e., the "load" that the driver must drive). Regardless, because lower supply voltage results in lower power consumption for most (if not all) electronic circuitry, the power consumption of each active lane can be further modulated through supply voltage adjustment.

Here, in most cases, the minimum acceptable power supply voltage will be configured for the transmitter. The two most significant factors that can affect the minimum acceptable power supply voltage, in most cases, will be: 1) the lowest supply voltage that is rated for the underlying technology (e.g., 1.8 v for a 0.25 μm CMOS process); 2) the size of the largest load that any one of the drivers is configured to drive in light of the lane speed.

In the case of the former, generally, the supply voltage should not be set beneath the lowest rated supply voltage (unless consultation with process and/or transistor level design engineers and/or thorough modeling is undertaken). In the case of the later, the size of the largest load is readily determinable by those of ordinary skill in light of various factors such as the length of the lane between the transmitter and receiver (e.g., "lane length") and whether or not the lane is implemented as a controlled impedance transmission line. Generally, the larger the lane load and the higher the lane speed, the larger the supply voltage needed to ensure data is acceptably received at the receiver end of the link. Again, those of ordinary skill can determine the appropriate lane speed, number of active lanes and lane supply voltage tradeoffs that apply so as to configure a transmitter operating point that corresponds to a working operating point (amongst the possible working operating points) that is at or closest to a theoretically lowest power consuming, working, operating point.

Thus to review, the transmitter design of FIG. 3 is capable of adjusting transmitter power consumption for a particular link bandwidth with three parameters: lane speed, the number of active lanes, and lane power supply voltage for purposes. According to FIG. 3, the function that determines each of these three parameters for a particular application is conveniently observed as a bandwidth and power consumption control unit 370. In practice, the "intelligence" of the bandwidth and power consumption control unit that actually determines the proper parameter set for the applicable environment (e.g., one or more of bandwidth and temperature) may be implemented "on-the-fly" according to any of a wealth of different techniques such as execution of software, reference to a look-up table, processing through combinatorial logic circuitry, combinations of the above, etc.

In other cases, particularly, where the applicable environment is expected to remain "fixed" over the lifetime of the transmitter (e.g., the link is between components within a laptop computer), the proper combination can be pre-determined (e.g., by any of the techniques described above) and loaded into a system that uses the transmitter as part of the system's manufacture (e.g., loading the proper parameters into the BIOS ROM of a laptop computer). Each time the system is turned on, the transmitter parameters are configured in accordance with the system's factory settings. Some more detailed and possible implementations for the bandwidth and power consumption control 370 are discussed in more detail below with respect to FIGS. 4a through 4c.

Figure 4A:
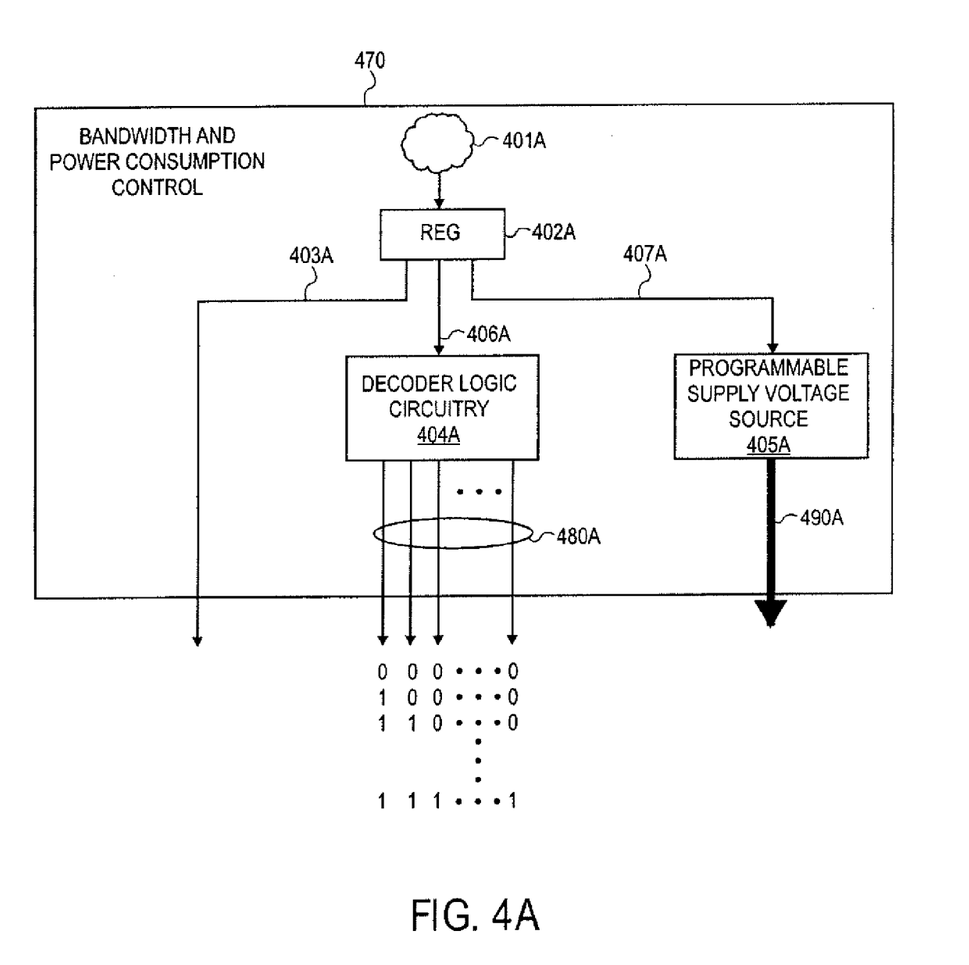
FIGS. 4a-4c show different implementations for effecting control of the three parameters described above with respect to FIG. 3.
Figure 4B:
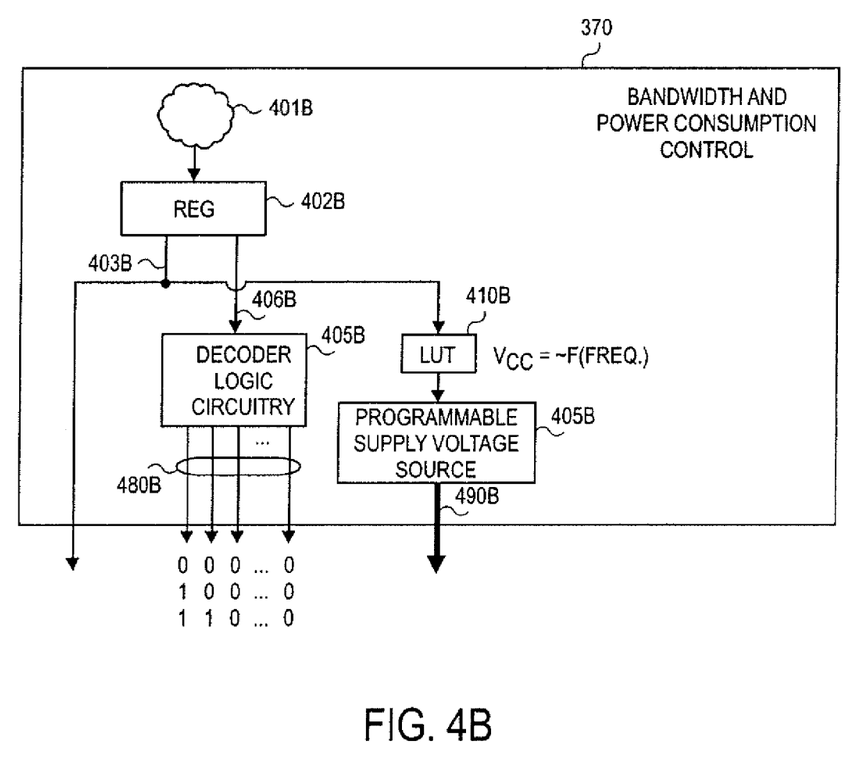
Figure 4C:
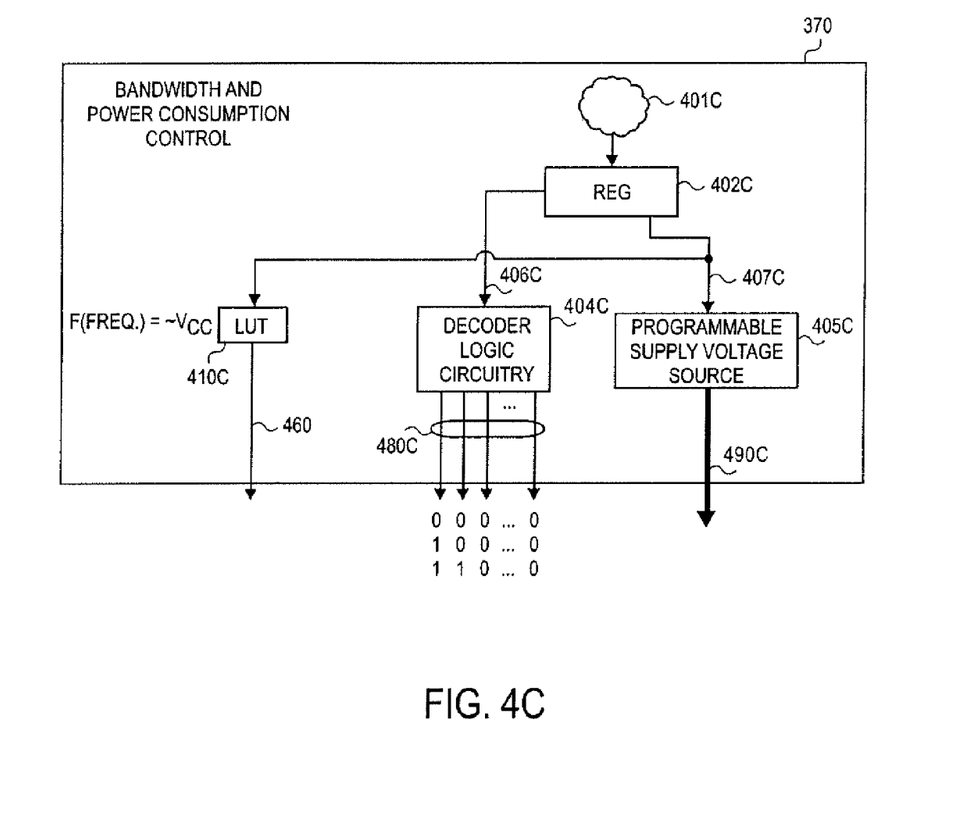

According to each of figures FIG. 4a through 4c, "cloud" 401 provides at least some initial information from which all the parameters for the particular environment are determined. Here, as discussed above, cloud 401 can be effected through execution of software, reference to one or more look-up tables, processing through combinatorial logic circuitry, combinations of the above, etc. In cases where the transmitter's environment is expected to change over its lifetime, cloud 401 is apt to be embedded in the system that transmitter is a part of (e.g., a computing system or networking system). In cases where the transmitter's environment is expected to be fixed over its lifetime, cloud 401 may be a non volatile read only memory that is loaded with appropriate information during manufacturing of the system (e.g., a computing system's BIOS ROM).

FIG. 4a corresponds to an embodiment where all three parameters are effectively provided and loaded into register space 402a. Register space is the area of one or more registers that can be loaded with information. A first portion 403a of the register's contents are used to set the PLL output clock frequency (i.e., corresponds to PLL input 360 of FIG. 3). A second portion 406a of the register's contents describes the number of lanes that are to be activated.

In an embodiment that can conform to the depiction of FIG. 4a, the register content describes the number of lanes to be activated in a binary format and decoder logic circuitry 404a converts the binary representation into a "one-hot encoded" format output 480a. The one-hot encoded format provides a bit for each lane where a first bit state (e.g., "1") signifies the corresponding lane is to be activated and a second bit state (e.g., "0") signifies the corresponding lane is to be de-activated. Each bit is routed to the lane that it corresponds to in order to control its activation. A third portion 407a of the register space content indicates the appropriate supply voltage (e.g., in binary format) which is then provided to a programmable supply voltage source 405.

According to the approach of FIG. 4b, the second region 406b of the register space 402b that indicates the number of active drivers can be implemented as described above with a binary to one-hot decoder 405b. The PLL clock frequency and power supply voltage are related in a way that enables the supply voltage to be determined from a first region 403b of the register space 402b that determines the PLL output clock frequency. Here, the first region 403b is as described above with respect to FIG. 4a (i.e., it sets the PLL output clock frequency) but is also used to set the supply voltage.

Here, the information that determines the PLL output clock frequency is forwarded to a look-up table (LUT) 410 that determines the appropriate supply voltage in light of information provided from register space 403b. The look-up table 410, in response to this information, provides a parameter (e.g., a word) that describes the appropriate supply voltage. In response to the receiving of this parameter, the programmable supply voltage 405b provides the appropriate supply voltage for the configured PLL output clock frequency. Here, LUT 410 could be implemented with a non-volatile ROM or random access memory. Alternatively, LUT 410 could be implemented with combinatorial logic that calculates the correct supply voltage outright.

FIG. 4c is similar to that described above with respect to FIG. 4b except that the PLL output clock frequency is set as a function of the appropriate supply voltage. That is, register space 402c provides a description of the number of drivers to be activated 406c (which is then decoded into one-hot format by decoder 404c); and, an indication of the proper power supply voltage 407c. In response to its receiving of the indication of the power supply voltage 407c, LUT 410c provides information 460 that sets the PLL's output clock frequency. Again, LUT 410 could be implemented with a non-volatile ROM or random access memory. Alternatively, LUT 410 could be implemented with combinatorial logic that calculates the correct supply voltage outright.

Figure 5:
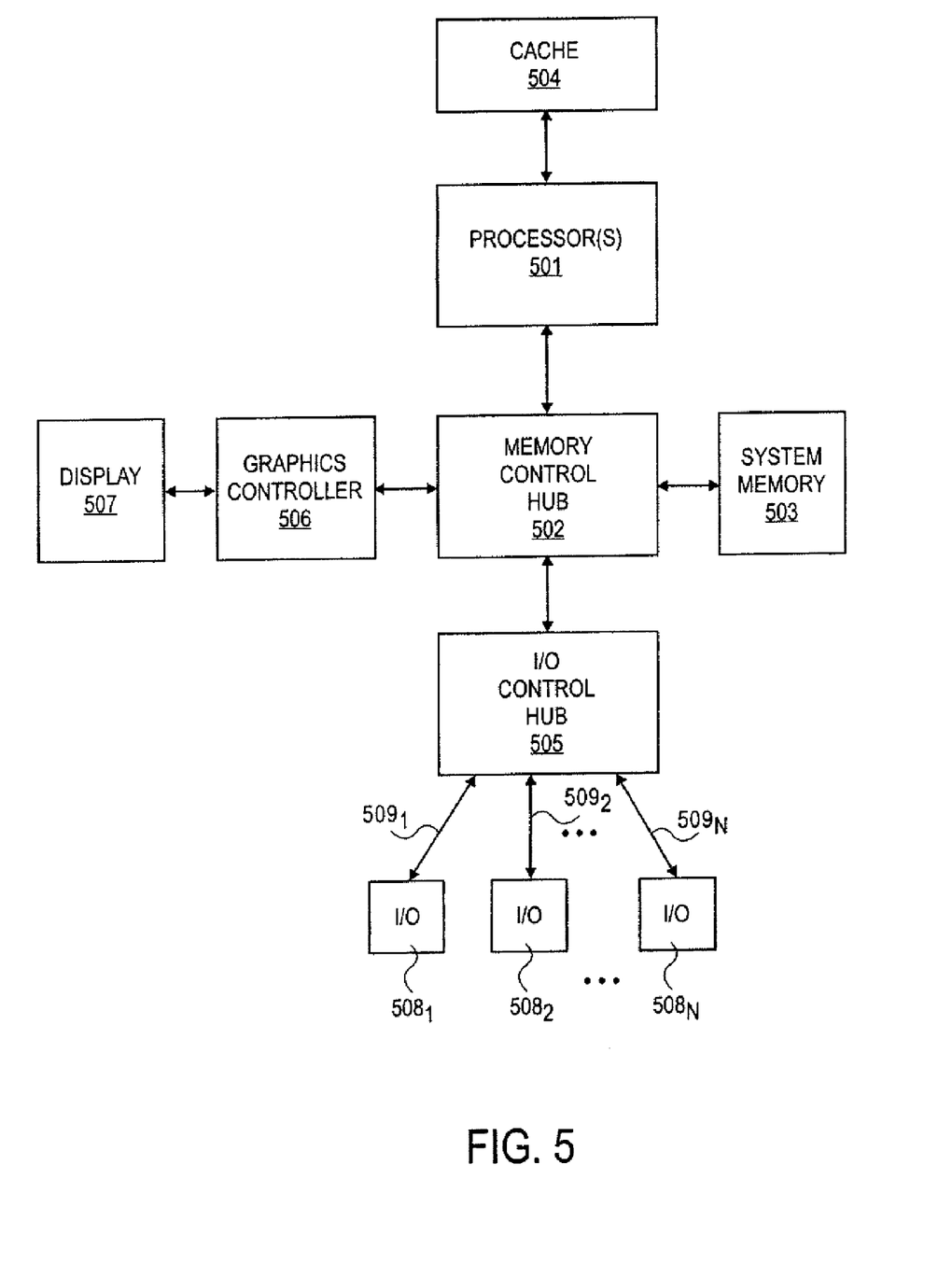
FIG. 5 shows an exemplary model of a computing system using point-to-point links between an I/O control hub and I/O devices

Before discussing FIG. 5, it is important to note that the receive side of a link can similarly adjust power consumption for a particular bandwidth by adjusting at least the number of active lanes and/or the power supply voltage of each channel's receiver (and perhaps various receive channel circuitry that follows the receiver such as a decoder circuit followed by a serial to parallel circuit). Of course, the number of active lanes on the receiver side should match the number of active lanes on the transmitter side.

Receiver side circuitry typically mirrors its transmitter side circuitry, thus, referring to FIG. 3, in one embodiment, the receive circuitry for each lane would include a receiver, followed by a serial to parallel and serial decoding circuitry, followed by a buffer. Here, a programmable power supply would be coupled to the power supply input of each lane's receiver if not one or more elements of the receiver's follow-on circuitry. Each lane could be configured active or inactive as described with respect to the transmitter circuitry. The received clock from the transmitter side would be used to clock the lane's active channels.

FIG. 5 shows an embodiment of a computing system. The exemplary computing system of FIG. 5 includes: 1) one or more processors 501; 2) a memory control hub (MCH) 502; 3) a system memory 503 (of which different types exist such as DDR RAM, EDO RAM, etc,); 4) a cache 504; 5) an I/O hub (ICH) 505; 6) a graphics controller 506; 7) a display/screen 507 (of which different types exist such as Cathode Ray Tube (CRT), Thin Film Transistor (TFT), Liquid Crystal Display (LCD), DPL, etc.; 8) one or more I/O devices 508; 9) one or more data transmitters 509. The one or more processors 501 execute instructions in order to perform whatever software routines the computing system implements. The instructions frequently involve some sort of operation performed upon data. Both data and instructions are stored in system memory 503 and cache 504. Cache 504 is typically designed to have shorter latency times than system memory 503. For example, cache 504 might be integrated onto the same silicon chip(s) as the processor(s) and/or constructed with faster SRAM cells whilst system memory 503 might be constructed with slower DRAM cells.

By tending to store more frequently used instructions and data in the cache 504 as opposed to the system memory 503, the overall performance efficiency of the computing system improves. System memory 503 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 503 prior to their being operated upon by the one or more processor(s) 501 in the implementation of a software program.

Similarly, data that a software program determines should be sent from the computing system to an outside entity through one of the computing system interfaces, or stored into an internal storage element, is often temporarily queued in system memory 503 prior to its being transmitted or stored. The ICH 505 is responsible for ensuring that such data is properly passed between the system memory 503 and its appropriate corresponding computing system interface (and internal storage device if the computing system is so designed). The MCH 502 is responsible for managing the various contending requests for system memory 503 access amongst the processor(s) 501, interfaces and internal storage elements that may proximately arise in time with respect to one another.

One or more I/O devices 508 are also implemented in a typical computing system. I/O devices generally are responsible for transferring data to and/or from the computing system (e.g., a networking adapter); or, for large scale non-volatile storage within the computing system (e.g., hard disk drive). ICH 505 has bi-directional point-to-point links between itself and each I/O device 508. In one embodiment, each bi-directional point-to-point link consists of two unidirectional lines where each line's direction is opposite from the other. A data transmitter 509 may be placed on the driving end of any point-to-point link (between each I/O device 508 and ICH 505).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
  propagating electronic signals within circuitry comprising a transmitter to perform a configuration method that includes:
    selecting a number of lanes, said lanes emanating from said transmitter;
    setting a speed for each of said lanes, said number and speed determining said transmitter's bandwidth; and,
    setting a driver supply voltage for each of said lanes wherein, power consumed by said transmitter as a consequence of said selecting a number of said lanes, said setting a speed for each of said lanes and said setting a driver supply voltage for
    each of said lanes is less than a power that would have been consumed by said transmitter had another available combination of lane number, lane speed and supply voltage been effected for said transmitter.

2. The method in claim 1 wherein said selecting and both said settings results in the least power consumption for said particular bandwidth amongst all available combinations of number of lane, lanes speed and supply voltage for said transmitter.

3. The method in claim 1 wherein said electronic signals are downstream from a register.

4. The method in claim 2 wherein said configuration method further comprises performing binary to one hot encoding downstream from said register to perform said selecting of a number of said transmitter's lanes.

5. The method in claim 1 wherein said configuration method further comprises setting a phase lock loop output signal frequency to set said speed for each of said lanes.

6. The method in claim 5 wherein said phase lock loop output signal frequency is a function of said supply voltage.

7. The method in claim 5 wherein said supply voltage is a function of said phase lock loop output signal frequency.

8. A method, comprising:
  as a consequence of turning a computing system on, loading information from a read only memory (ROM);
  propagating electronic signals within circuitry of said computing system that includes a transmitter to perform a configuration method that includes:
    selecting a number of lanes, said lanes emanating from said transmitter;
    setting a speed for each of said lanes, said number and speed determining said transmitter's bandwidth; and,
    setting a driver supply voltage for each of said lanes wherein, power consumed by said transmitter as a consequence of said selecting a number of said lanes, said setting a speed for each of said lanes and said setting a driver supply voltage for each of said lanes is less than a power that would have been consumed by said transmitter had another available combination of lane number, lane speed and supply voltage been effected for said transmitter, said number of lanes, said speed and said driver supply voltage being determined from said information.

9. The method in claim 1 wherein said selecting and both said settings results in the least power consumption for said particular bandwidth amongst all available combinations of number of lane, lanes speed and supply voltage for said transmitter.

10. The method in claim 1 wherein said electronic signals are downstream from a register.

11. The method in claim 2 wherein said configuration method further comprises performing binary to one hot encoding downstream from said register to perform said selecting of a number of said transmitter's lanes.

12. The method in claim 1 wherein said configuration method further comprises setting a phase lock loop output signal frequency to set said speed for each of said lanes.

13. The method in claim 5 wherein said phase lock loop output signal frequency is a function of said supply voltage.

14. The method in claim 5 wherein said supply voltage is a function of said phase lock loop output signal frequency.

* * * * *